March 1, 1955    F. V. HASKELL ET AL    2,703,218
METHOD AND APPARATUS FOR INSTALLING AERIAL CABLES
Filed Dec. 6, 1950    5 Sheets-Sheet 1

INVENTORS F. V. HASKELL
S. M. SUTTON
O. L. WALTER
BY
ATTORNEY

March 1, 1955 F. V. HASKELL ET AL 2,703,218
METHOD AND APPARATUS FOR INSTALLING AERIAL CABLES
Filed Dec. 6, 1950 5 Sheets-Sheet 2

INVENTORS F. V. HASKELL
S. M. SUTTON
O. L. WALTER
BY
ATTORNEY

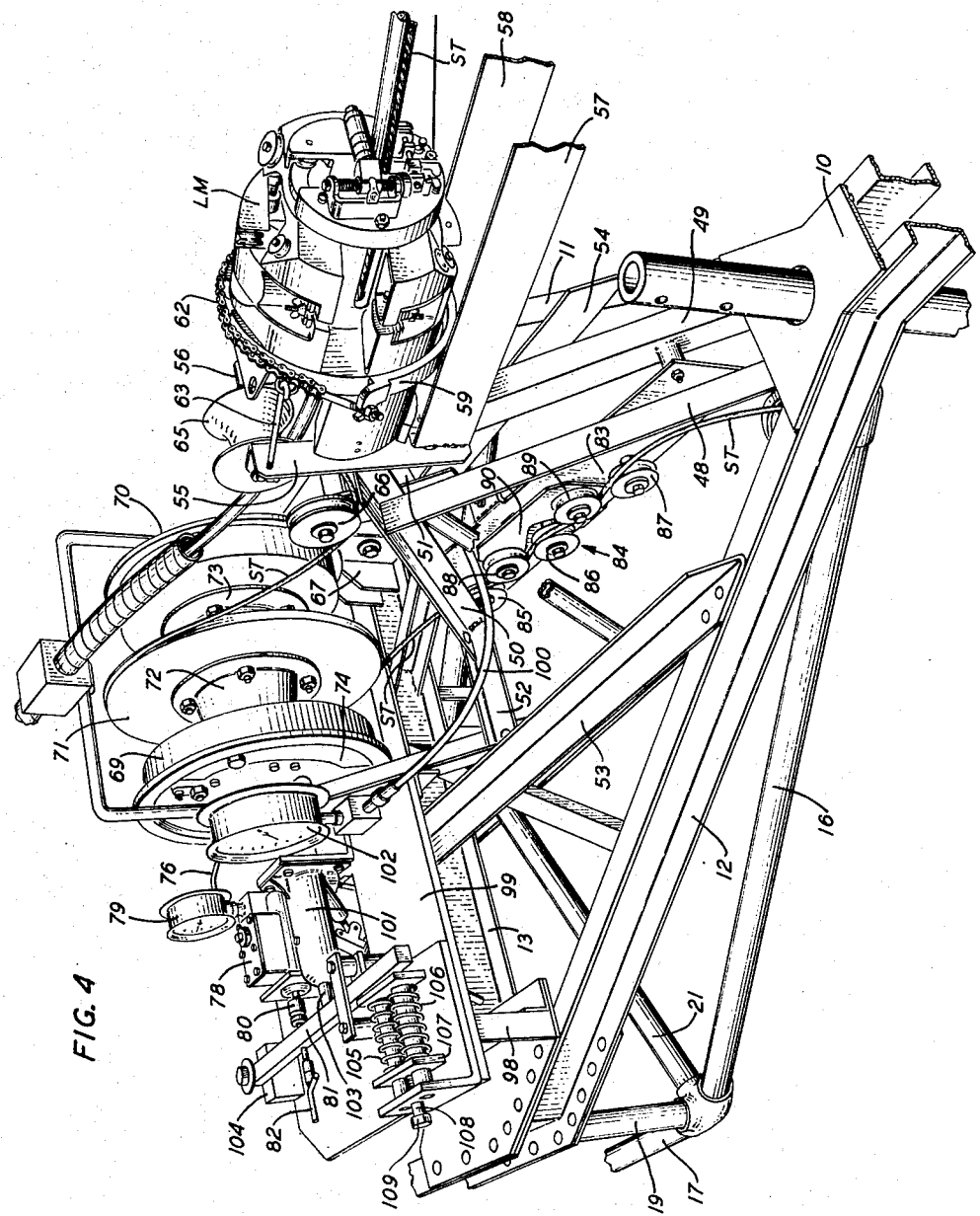

March 1, 1955  F. V. HASKELL ET AL  2,703,218
METHOD AND APPARATUS FOR INSTALLING AERIAL CABLES
Filed Dec. 6, 1950  5 Sheets-Sheet 4
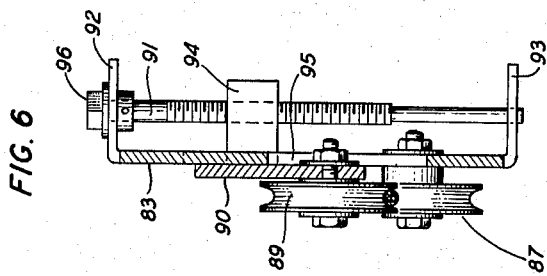
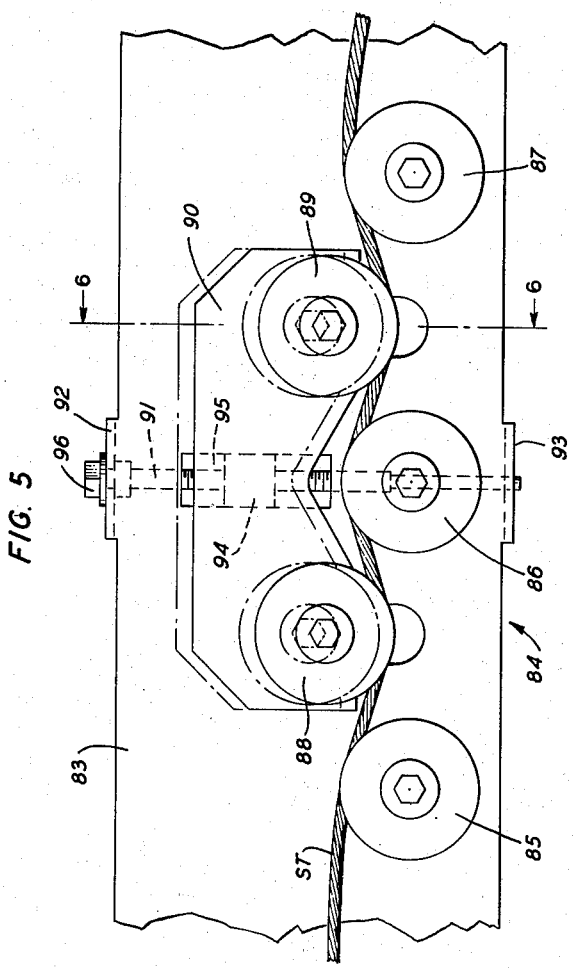
INVENTORS F. V. HASKELL
S. M. SUTTON
O. L. WALTER
BY
ATTORNEY

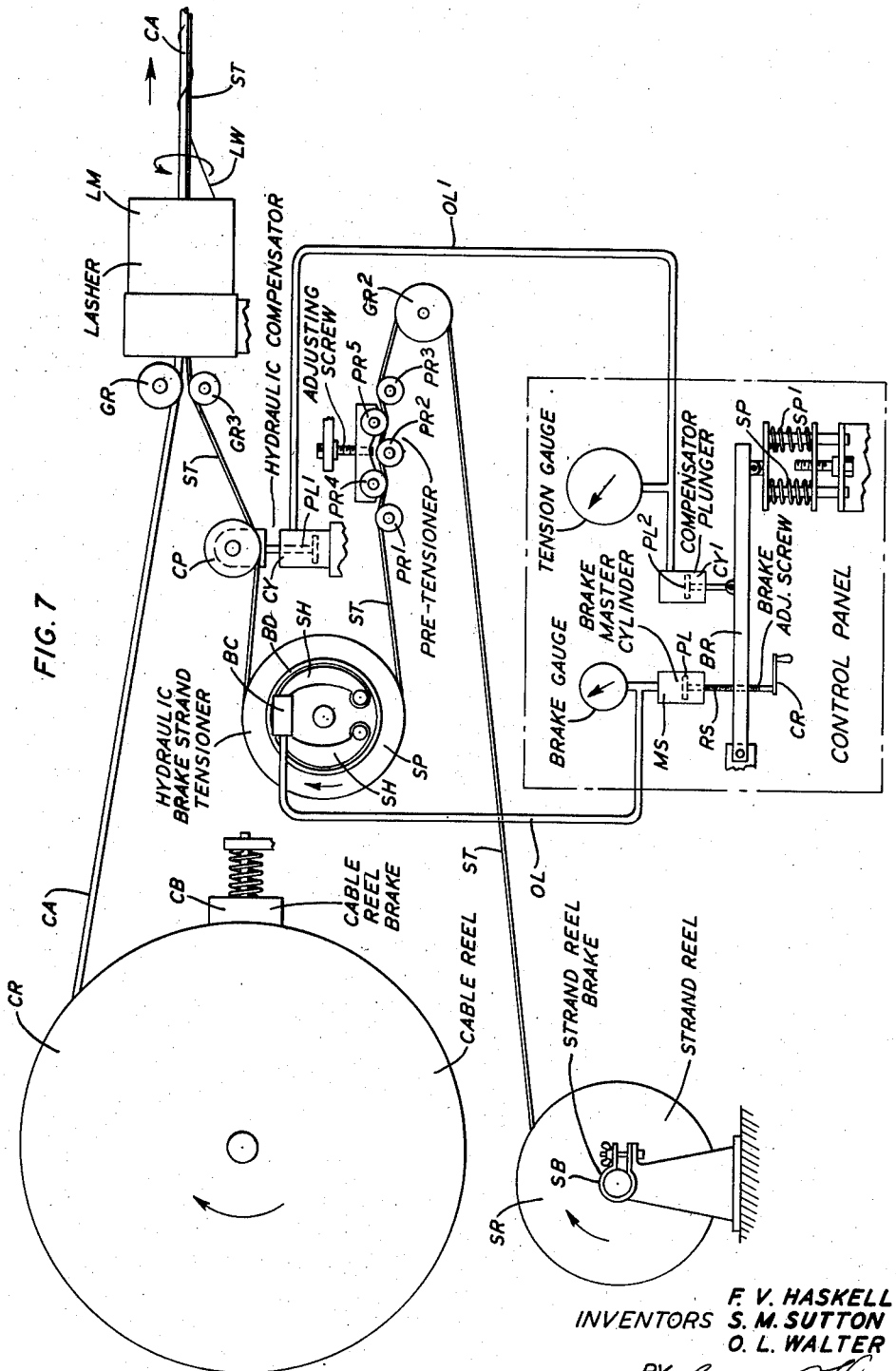

2,703,218
Patented Mar. 1, 1955

UNITED STATES PATENT OFFICE

2,703,218

METHOD AND APPARATUS FOR INSTALLING AERIAL CABLES

Frederic V. Haskell, Gladstone, Stanford M. Sutton, Morristown, and Orville L. Walter, Maplewood, N. J., assignors to Bell Telephone Laboratories, Incorporated, New York, N. Y., a corporation of New York Application December 6, 1950, Serial No. 199,491

3 Claims. (Cl. 254—134.3)

This invention relates to a method and apparatus for installing aerial cables and more particularly, for prelashing the cable to a supporting strand, on the ground, prior to its placement on the pole line.

One object of the invention is to provide a method and means for securing a cable to a supporting strand in such a manner that the spiral wrappings of lashing wire are substantially uniform and firmly embrace both the cable and supporting strand.

Another object of the invention is the provision of a method and means for prelashing and installing an aerial cable in which the tension on the cable and strand may be accurately controlled during installation to provide the proper tension in the completed run.

In the installation of aerial cable which contemplates the supporting of the cable from a supporting or messenger strand by lashing the cable to a previously installed supporting strand by means of a cable-lashing machine, for example, the cable-lashing machine disclosed in Patent No. 2,272,253 and in the patent application Serial No. 58,570, now Pat. No. 2,544,313, filed in the name of J. J. Harley, filed November 5, 1948, it is the practice to secure the supporting strand to suitable poles at regular intervals and temporarily support, from the strand, by means of blocks or rings, the cable intended to be permanently secured thereto. A cable-lashing machine of the type referred to heretofore, is intended to traverse the strand and securely bind the cable and strand together by means of a suitable wrapping of lashing wire, the temporary support blocks or rings being pushed along in front of the machine as the machine progresses along the strand.

While the above method of installing aerial cable has been highly successful and is in wide use, there are conditions where it would be advisable and convenient to lash the cable and the strand together prior to its being placed in position on the pole line.

It is with the prelashing of the cable to its supporting strand that this invention is concerned and more particularly with a method and means which contemplates the feeding of the cable and the strand from suitable reels, lashing a wire therearound as it is pulled up into position on the pole line and applying suitable back tension to the cable and strand during the operation to assure the right amount of tension and sag in the completed run. Means are provided for accurately controlling the tension of the cable and the strand as they leave the storing reels prior to passage through the machine which lashes the strand and cable together.

While any suitable machine may be used for wrapping the lashing wire around the strand and cable, we have found that the machine shown in the patent application of J. J. Harley Serial No. 58,570 previously referred to, performs very satisfactorily.

The invention will be more clearly understood from the following detailed description when read in connection with the accompanying drawings, in which:

Fig. 3 is a perspective view, looking from the front of the machine and shows the lashing machine, storage reels, and the braking mechanism for applying tension to the strand.

Fig. 4 is a fragmentary perspective view, showing the lashing machine in detail, the compensating mechanism for controlling the tension in the strand and the snubbing of pretensional mechanism for the strand;

Fig. 5 is a fragmentary view in elevation of the snubbing arrangement for the strand;

Fig. 6 is a cross-sectional view taken on line 6—6 of Fig. 5; and

Fig. 7 is a schematic illustrating the component parts of the cable-lashing equipment shown in Figs. 1 through 6.

Figure 2:
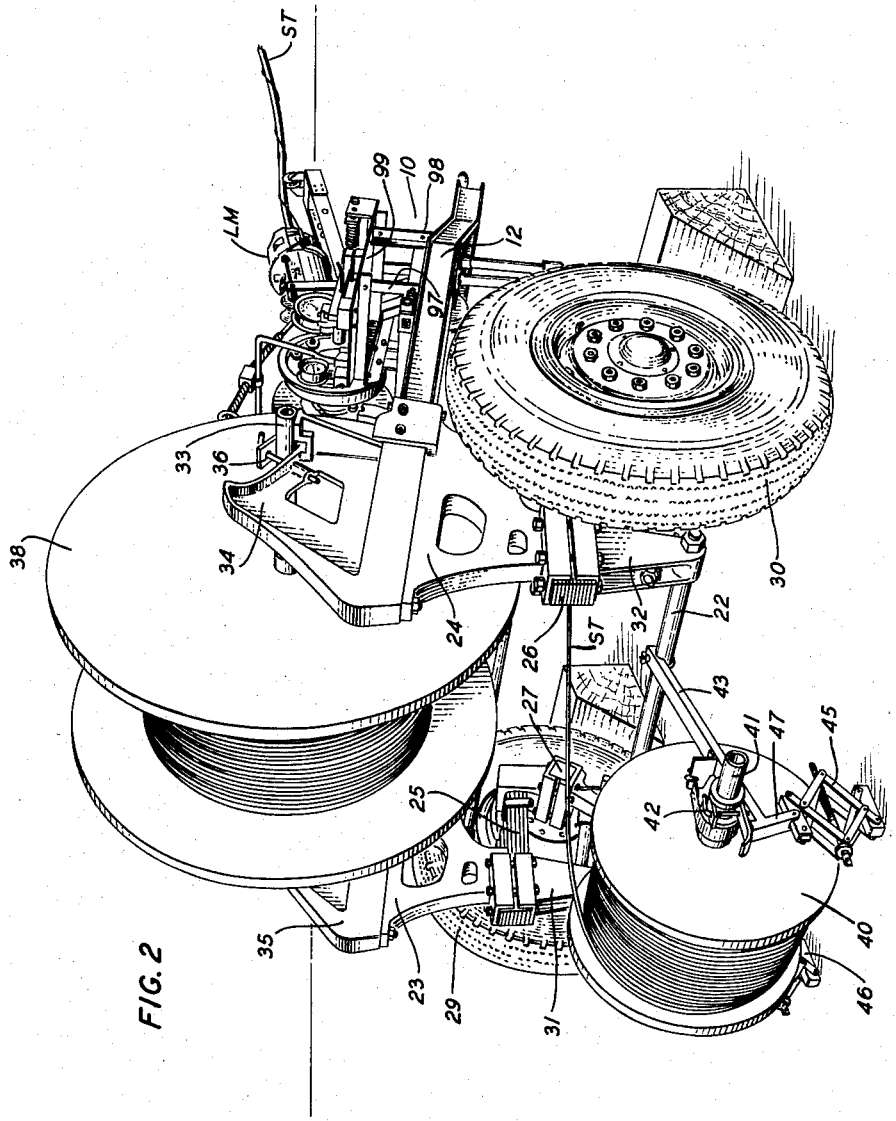
Fig. 2 is a perspective view looking from the rear, of the chassis which supports the storage reels, lashing machine and auxiliary control apparatus.

In the accompanying drawings, Figs. 2, 3 and 4 disclose a cable reel trailer chassis 10, which comprises the frame members 11, 12 and 13, longitudinal brace members 14, 15, 16 and 17, vertical braces 18 and 19, diagonal braces 20 and 21 and a cross brace member 22. Individual sprung on the frame members 11 and 12 by means of the hangers 23 and 24, and the leaf springs 25 and 26 and the axles 27 and 28, are the wheels 29 and 20 which are stabilized by means of the brace 22 which is secured to the downwardly extending members 31 and 32.

Rotatably supported, toward the rear of the chassis 10, on the axle 33 which is fixedly secured to the supporting members 34 and 35, by means of the clamping devices 36 and 37, is the cable storing reel 38 which is provided with a brake block 39 which is in frictional engagement with the periphery of the reel 38 to provide a drag thereon to brake the reel to prevent the cable from overrunning and becoming entangled in the event that it is necessary to halt the lashing operation.

As shown in Figs. 2 and 3, there is positioned at the rear of the chassis 10 and beneath the cable reel 38, a strand storing reel 40 which is rotatably supported on an axle 41. The axle 41 is rigidly secured by means of clamping devices 42—42 to the supporting arms 43 and 44 which extend rearwardly and have their inner ends pivotally secured to the brace member 22. The outer ends of the arms 43 and 44 are adjustably supported by means of the screw jacks 45 and 46 which are secured to the downwardly projecting portions 47—47 of the arms 43 and 44.

As shown in Figs. 2, 3 and 4, and more particularly in Fig. 4, a cable-lashing machine LM is mounted on the forward part of the chassis 10 in such a manner that it is readily accessible and may be easily attached and detached. The support for the lashing machine LM comprises a pair of angle iron members 48 and 49 secured to the forward end of the chassis 10 and extending upwardly and rearwardly at an angle and has secured thereto the downwardly extending angle iron members 50 and 51 which in turn are secured to the cross brace 52 which is secured to the lateral braces 53 and 54 which in turn are secured to the chassis frame members 11 and 12.

Pivotally secured to the upper ends of the members 48, 49, 50 and 51, are the two vertically extending angle iron members 55 and 56. These have secured at their lower ends, the laterally extending spaced apart members 57 and 58 which have mounted on the upper ends thereof the cradle member 59 which supports the lashing machine LM. The free ends of the members 57 and 58 are secured together and provided with an outboard guide pulley 60 and means such as a turn buckle 61 secured thereto and to the chassis 10, for adjusting the elevation of the members 57 and 58.

The lashing machine LM is secured in the cradle member 59 by the chain 62 which surrounds the lashing machine and has its ends adjustably secured to the ends of the cradle member as shown in Fig. 4. To lock the lashing machine LM in position and to prevent displacement thereof, suitable tie rods or bolts 63 and 64, having hooks on their inner ends, are in engagement with eyes on the rear of the lashing machine, pass through and are secured in the members 55 and 56. A cable guide roller 65 is rotatably mounted on the upper end of the members 55 and 56 and is in alignment with the central bore of the lashing machine LM.

Mounted to the rear of the lashing machine LM, beneath the roller 65 and in alignment therewith is the strand tensioning compensating roller 66 which is adjustably mounted in a hydraulic cylinder the purpose of which will be described in detail hereinafter.

As shown, there is rotatably mounted behind the lashing machine LM, and supported on the chassis 10 by means of the vertically extending members 67 and 68, which are secured to the lateral members 53 and 54, the brake drums 69 and 70 and the strand tensioning pulley 71. The brake drums 69 and 70 and the pulley 71 are rigidly coupled together by the flange members 72 and 73 and rotate as a unit on a common shaft. Suitable brake shoes (not shown) are mounted on the housing plates 74 and 75, between the plates and the brake drums and are adapted to engage the inner surfaces of the drums 69 and 70 when actuated hydraulically as will be hereinafter described in detail, to brake the rotation of the strand tensioning pulley 71.

The brake operating mechanisms (not shown) enclosed in the brake housings, are of the usual hydraulically operated type which utilize an oil-filled cylinder mechanically coupled to the brake shoes to force the shoes into intimate contact with the inner surfaces of the brake drums to brake the rotation thereof. Since this mechanism, that is, the braking mechanism, is well-known, and forms no part of the present invention, it is believed that no further description thereof is necessary.

The brake mechanism (not shown) as heretofore referred to, located in the housings for the drums 69 and 70 are connected by means of the oil lines 76 and 77 to the master brake cylinder 78 which has a pressure gauge 79 associated therewith. The master cylinder 78 is of the usual oil-filled plunger type and is actuated by means of the shaft 80 which is threadedly mounted in the bar 81 and is adapted to either adjustably increase or decrease the pressure in the cylinder 78 by the clockwise or counterclockwise rotation of the handle 82 attached thereto which causes the shaft 80 and the plunger (not shown) attached thereto to move inwardly or outwardly. Thus, the clockwise rotation of the handle 82 will cause the shaft 80 to move inwardly, increase the pressure in the cylinder 78 and through the oil lines 76 and 77 cause the brake shoes to engage the drums 69 and 70 with a pressure commensurate with the pressure applied thereto, such pressures being indicated on the gauge 79 with the consequent braking of the strand tensioning pulley 71.

Mounted beneath and forward of the strand tensioning pulley 71, on a laterally extending plate member 83, which is secured to the chassis 10, is the pretensioning device 84. This device applies an initial or rough tension adjustment to the strand ST prior to its passing around the tensioning pulley 71, and comprises, as shown more in detail in Figs. 5 and 6, the non-adjustable rotatably mounted pulleys 85, 86 and 87 which are spaced apart in horizontal alignment on the plate member 83, and the adjustable pulleys 88 and 89 which are mounted on the vertically adjustable yoke member 90.

The pulleys 88 and 89 are mounted in horizontal alignment on the yoke 90, above the pulleys 85, 86 and 87 and are in staggered relation therewith. They are adapted to be vertically adjusted by means of the threaded shaft 91 which is journalled in the extending portions 92 and 93 and has mounted thereon the traveling boss 94 which extends through the slot 95 in the member 83 and is fixedly secured to the yoke 90. Means 96 on the upper end of the shaft 91, is provided for imparting a clockwise or counterclockwise rotation to the shaft, with a suitable tool, (not shown), to cause the yoke 90 to travel either upwardly or downwardly, with a consequent raising or lowering of the pulleys 88 and 89, as shown by the dot and dash lines in Fig. 5, which causes the strand ST passing between the pulleys 85, 86 and 87 and the pulleys 88 and 89 to be braked with varying degrees of pressure.

Mounted on the chassis 10 by suitable supports 97 and 98 is a horizontal plate member 99, which has mounted thereon the apparatus for adjusting and controlling the tension on the supporting strand ST as it leaves the strand reel 40 on its way to the lashing machine LM, as shown in Fig. 4. As heretofore referred to, there is mounted the oil-filled master brake cylinder 78, which is connected to the two brake drums 69 and 70 by means of the oil lines 76 and 77 for applying hydraulic pressure to the brake drums for braking the pulley 71 secured thereto. This is accomplished by the manually adjustable brake handle 82 which upon operation either in a clockwise or counterclockwise direction, in the threaded aperture in the bar 81, causes the shaft 80 to travel either inwardly or outwardly in the brake cylinder 78 thereby causing an increase or decrease of pressure in the oil lines 76 and 77 connected to the braking means associated with the drums 69 and 70. In order to insure the proper amount of tension applied to the strand, the handle 82 is operated until the correct tension in pounds is indicated on the gauge 79. In order to maintain a constant tension on the strand ST, the strand tensioning compensating roller 66, which engages the strand prior to its entrance into the lashing machine LM, is connected to a hydraulic compensator which comprises an oil-filled cylinder having a plunger slidably mounted therein. An oil line 100 runs from this cylinder and is connected to the compensating plunger housing 101 and to the gauge 102 as shown in Fig. 4. The compensator housing 101, is oil filled and has a plunger slidably mounted therein which is connected to the bar 81 by means of the shaft 103. The bar 81 is pivotally mounted on the support 104 and is adapted to move inwardly or outwardly under the influence of the shaft 103 in accordance with the pressure imparted to the plunger in the housing 101 by the oil pressure in the line 100 which is built up by the action of the strand tensioning roller 66 in accordance with the tension on the strand ST. In order to control the action of the compensating member, the bar 81 is loaded with the coil springs 105 and 106 which are slidably mounted on the yoke 107 and are adjustably tensioned by means of the threaded shaft 108 which is rotated by means of the nut 109.

As shown in Figs. 3 and 4 an adjustable forward support is provided for the course elevational adjustment of the lashing machine LM.

In the installation of the aerial cable in accordance with the present invention and with particular reference to the schematic disclosure in Fig. 7 and the mechanisms as heretofore described with reference to Figs. 2 to 6, inclusive, the cable CA to be installed is stored on the cable reel or drum CR and the supporting strand ST is stored on the reel SR both of which are rotatably supported on suitable mounts and provided with braking devices CB and SB. As shown in Fig. 7, the cable CA leaves the cable reel CR and is fed directly into the lashing machine LM and guided thereto by the roller GR, where it is secured to the supporting strand ST by the lashing wire LW being wrapped around as shown.

The supporting strand ST leaves the reel SR and passes around the guide roller $GR^2$ between the fixed pretensioning rollers $PR^1$, $PR^2$, and $PR^3$ and the adjustable rollers $PR^4$ and $PR^5$. The strand then passes around the strand tension pulley SP which has its shaft secured to the brake drum BD. The strand ST as it leaves the pulley SP passes around the compensator pulley CP and thence into the lashing machine LM over the roller $GR^3$ where it is lashed to the cable CA by the lashing wire LW and emerges therefrom as shown.

Figure 1:
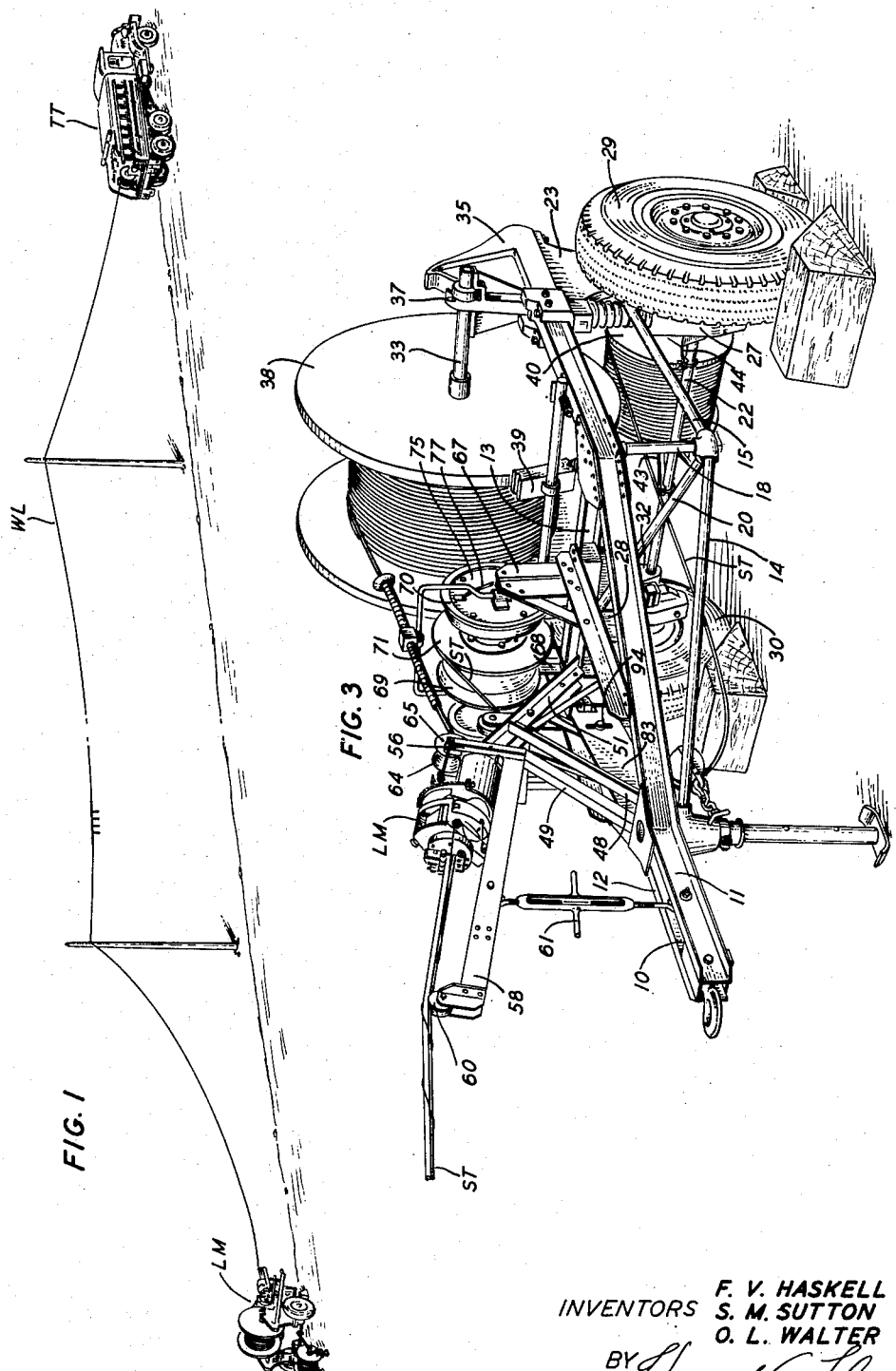
Fig. 1 is an over-all view illustrating an aerial cable being installed in accordance with this invention and shows the lashed cable and strand leaving the lashing machine and being pulled into position on the pole by a suitable tow truck.

The tension of the strand ST must be accurately controlled as it enters the lashing machine LM for the successful installation of the prelashed cable, wherein in accordance with this invention the cable is lashed to the supporting strand prior to its installation on the supporting poles as shown in Fig. 1.

As shown in Fig. 7, an initial tension is applied to the strand ST by means of the pretensioning mechanism wherein the tension may be varied by the adjustment of the rollers $PR^4$ and $PR^5$. Since this is an initial tension and is in effect a rough adjustment, a fine and accurate adjustment is obtained by passing the strand ST around a brake pulley SP which is hydraulically braked by means of the master brake cylinder MS which is oil filled and equipped with a manually operated plunger PL secured to the rotatable shaft RS threadably mounted in the bar BR. Thus, when the shaft RS is rotated by means of the crank CR, the pressure in the oil line OL will either be increased or decreased depending upon the action of the pluger PL, thereby causing the brake shoes SH to engage the brake drum BD with a varying amount of pressure depending upon the pressure exerted through the oil line by the master cylinder.

In order to maintain the tension in the strand within very close limits, a compensating pulley CP is mounted between the lashing machine LM and the strand tensioning pulleys SP. This pulley rides on the strand ST and any change in the tension thereof will immediately be transmitted to this pulley which will cause the plunger $PL^1$ in the oil-filled cylinder CY, to operate and cause the pressure in the oil line $OL^1$ to either increase or decrease and cause the plunger $PL^2$ in the oil-filled cylinder $CY^1$ to operate and cause the lever arm attached thereto to move either inwardly or outwardly against the tension of the springs SP and $SP^1$ and cause the pressure in the oil line to increase or decrease depending on the operation of the bar BR and the consequent operation either inwardly or outwardly of the shaft RS and the plunger PL, in the master cylinder MS. This results in increasing or decreasing the braking action on the pulley SP as indicated by the compensating pulley CP thus assuring uniform and accurate tensioning of the strand ST as it is fed to the lashing machine LM.

The prelashed cable CA and its strand ST as it leaves the lashing machine LM may be hoisted into position on the poles and supported in any convenient manner for example by means of sheaves (not shown) secured to the poles and having a winch or tow line passing therethrough, one end of which is secured to the winch on the truck TT as shown in Fig. 1 and the other attached to the ends of the strand ST and cable CA.

While we have shown and described the preferred embodiment of our invention it is to be understood that the invention is not limited to the precise details shown and that various changes and modifications may be made therein without departing from the scope and spirit of the invention.

What is claimed is:

1. An apparatus for prelashing a multi-conductor sheathed cable to a supporting strand which comprises a mobile chassis, a cable supply reel and a strand supply reel mounted on said chassis to the rear thereof, lashing means mounted on the forward end of the chassis and operable by the strand passing therethrough, for wrapping a lay of wire around the cable and the strand to secure them together as they pass through said lashing means, tensioning means mounted on said chassis between said strand supply reel and said lashing means for applying and regulating back tension on the supporting strand prior to its entrance into the lashing means, said tensioning means comprising a brake pulley around which the strand traverses, and hydraulic means for controlling said brake pulley, said hydraulic means connected to a master brake cylinder and operated thereby, said master brake cylinder operatively controlled by mechanical actuating means, a second hydraulic means, said master brake cylinder actuating means operatively connected to and controlled by said second hydraulic means, said second hydraulic means controlled and actuated by hydraulic compensator means positioned between said lashing means and said brake pulley, whereby the tension on the cable supporting strand is automatically determined prior to its being secured to the cable by said lashing means.

2. An apparatus for prelashing a multi-conductor sheathed cable to a supporting strand which comprises a mobile chassis, a cable supply reel and a strand supply reel mounted on said chassis to the rear thereof, lashing means mounted on the forward end of the chassis and operable by the strand passing therethrough, for wrapping a lay of wire around the cable and the strand to secure them together as they pass through said lashing means, tensioning means mounted on said chassis between said strand supply reel and said lashing means for applying, regulating and indicating the back tension applied to the supporting strand prior to its entrance into the lashing means, said tensioning means comprising a brake pulley around which the strand traverses, and hydraulic means for controlling said brake pulley, said hydraulic means connected to a master brake cylinder and operated thereby, said master brake cylinder operatively controlled by mechanical actuating means, a second hydraulic means, said master brake cylinder actuating means operatively connected to and controlled by said second hydraulic means, said second hydraulic means controlled and actuated by hydraulic compensator means positioned between said lashing means and said brake pulley whereby the tension on the cable supporting strand is automatically determined prior to its being secured to the cable by said lashing means, and means on said master brake cylinder and said compensating means for visually indicating the tension applied to the strand.

3. An apparatus for prelashing a multi-conductor sheathed cable to a supporting strand which comprises a mobile chassis, a cable supply reel and a strand supply reel mounted on said chassis to the rear thereof, lashing means mounted on the forward end of the chassis and operable by the strand passing therethrough, for wrapping a lay of wire around the cable and the strand to secure them together as they pass through said lashing means, tensioning means mounted on said chassis between said strand supply reel and said lashing means for applying regulating and indicating back tension on the supporting strand prior to its entrance into the lashing means, said tensioning means comprising a brake pulley around which the strand traverses, and hydraulic means for controlling said brake pulley, said hydraulic means connected to a master brake cylinder and operated thereby, said master brake cylinder operatively controlled by mechanical actuating means, a second hydraulic means, said master brake cylinder actuating means operatively connected to and controlled by said second hydraulic means, said second hydraulic means controlled and actuated by hydraulic compensator means positioned between said lashing means and said brake pulley whereby the tension on the cable supporting strand is automatically determined prior to its being secured to the cable by said lashing means, means on said master brake cylinder and on said compensating means for visually indicating the tension applied to the strand, and a manually adjustable pretensioning device, through which the strand passes, positioned between the strand supply reel and said hydraulically controlled brake pulley.

References Cited in the file of this patent

UNITED STATES PATENTS

| | | |
|---|---|---|
| 1,173,190 | Hoopes | Feb. 29, 1916 |
| 2,175,479 | Miller | Oct. 10, 1939 |
| 2,213,363 | Creswell | Sept. 3, 1940 |
| 2,272,253 | St. John | Feb. 10, 1942 |
| 2,295,749 | Neale | Sept. 15, 1942 |
| 2,300,035 | Neale | Oct. 27, 1942 |
| 2,331,371 | Bridges | Oct. 12, 1943 |
| 2,343,181 | Heinz | Feb. 29, 1944 |
| 2,400,739 | Burge | May 21, 1946 |
| 2,544,313 | Harley | Mar. 6, 1951 |
| 2,557,185 | Gibbs | June 19, 1951 |